(12) United States Patent
Sharp et al.

(10) Patent No.: US 12,373,321 B1
(45) Date of Patent: Jul. 29, 2025

(54) DATABASE DISRUPTION DETECTION AND FAILOVER

(71) Applicant: Salesforce, Inc., San Francisco, CA (US)

(72) Inventors: Tyler Sharp, Olathe, KS (US); Cory Tenbarge, Overland Park, KS (US)

(73) Assignee: Salesforce, Inc., San Francisco, CA (US)

( * ) Notice: Subject to any disclaimer, the term of this patent is extended or adjusted under 35 U.S.C. 154(b) by 10 days.

(21) Appl. No.: 18/422,221

(22) Filed: Jan. 25, 2024

(51) Int. Cl.
*G06F 11/34* (2006.01)

(52) U.S. Cl.
CPC .............................. *G06F 11/3409* (2013.01)

(58) Field of Classification Search
None
See application file for complete search history.

(56) References Cited

U.S. PATENT DOCUMENTS

| | | | |
|---|---|---|---|
| 6,629,266 B1 | 9/2003 | Harper et al. | |
| 7,668,879 B2 * | 2/2010 | Vivian | G06F 11/2028 709/204 |
| 9,984,140 B1 * | 5/2018 | Sukumaran | G06F 16/27 |
| 10,949,280 B2 | 3/2021 | Jayaraman | |
| 11,449,394 B2 | 9/2022 | Bedadala et al. | |
| 11,698,843 B2 | 7/2023 | Sangala et al. | |
| 2007/0198700 A1 * | 8/2007 | Vivian | G06F 11/2097 709/224 |
| 2017/0344618 A1 * | 11/2017 | Horowitz | G06F 16/27 |
| 2021/0349795 A1 * | 11/2021 | Sangala | G06F 11/3034 |
| 2024/0160539 A1 * | 5/2024 | Khatri | G06F 11/008 |

\* cited by examiner

*Primary Examiner* — Quang N Nguyen
(74) *Attorney, Agent, or Firm* — Kowert, Hood, Munyon, Rankin & Goetzel, P.C.; Scott W. Pape; Dean M. Munyon (57) ABSTRACT

Techniques are disclosed relating to a monitoring service executing in a public cloud computer system. A method may include receiving metrics for a database system implemented on a single instance of a virtual machine in the public cloud computer system. The metrics may include a set of metrics indicative of status of the database system, a set of metrics indicative of status of the virtual machine, and a set of metrics indicative of status of the public cloud computer system. The method may also include continuously determining a primary database candidate from a set of standby databases, and detecting that metrics correspond to one of a plurality of disruption scenarios. The method may further include issuing, based on the detecting, a command to trigger a failover to the primary database candidate.

20 Claims, 6 Drawing Sheets

Receiving, by a monitoring service executing in a public cloud computer system, metrics for a database system implemented on a single instance of a virtual machine in the public cloud computer system, the metrics including a first set of metrics indicative of status of the database system, a second set of metrics indicative of status of the virtual machine, and a third set of metrics indicative of status of the public cloud computer system.
*410*

Continuously determining, by the monitoring service, a primary standby database candidate from a set of standby databases.
*420*

Detecting, by the monitoring service, that metrics correspond to one of a plurality of disruption scenarios.
*430*

Issuing, by the monitoring service based on the detecting, a command to trigger a failover to the primary standby database candidate.
*440*

```
┌─────────────────────────────────────────────────────────────┐
│ Determining, for ones of the set of standby databases, a    │
│ respective lag time for performing the failover.            │
│                            510                              │
└─────────────────────────────────────────────────────────────┘
                              ↓
┌─────────────────────────────────────────────────────────────┐
│ Selecting, as the primary standby database candidate, one   │
│ of the standby databases based on the respective lag times. │
│                            520                              │
└─────────────────────────────────────────────────────────────┘
                              ↓
┌─────────────────────────────────────────────────────────────┐
│ Repeating the determining of the respective lag times.      │
│                            530                              │
└─────────────────────────────────────────────────────────────┘
                              ↓
┌─────────────────────────────────────────────────────────────┐
│ In response to a change in the respective lag times,        │
│ selecting, as the primary standby database candidate, a     │
│ different one of the standby databases.                     │
│                            540                              │
└─────────────────────────────────────────────────────────────┘
                              ↓
┌─────────────────────────────────────────────────────────────┐
│ Cancelling the command to trigger the failover in response  │
│ to determining that a current lag time for failing-over to  │
│ the primary standby database candidate fails to satisfy a   │
│ threshold lag time.                                         │
│                            550                              │
└─────────────────────────────────────────────────────────────┘
```

DATABASE DISRUPTION DETECTION AND FAILOVER

BACKGROUND

Technical Field

Embodiments described herein are related to the field of database management systems, and more particularly to the detection of database disruptions and subsequent failover mechanisms.

Description of the Related Art

Multi-tenant web services may allow individual enterprises and software as a service (SaaS) vendors to develop robust and reliable Internet-scale applications. Web applications may access objects within a database and process information accessed from the objects. Data objects stored within a database may be processed in response to certain accesses of the object by a plurality of users associated with a given tenant. Various tenants may have a service-level agreement (SLA) with a respective web service. An SLA may set one or more expectations and/or guarantees between the web service provider and a given tenant regarding services to be provided and the metrics by which performance of the services will be judged, for example, minimum amount of service downtime and minimum lag times for fulfilling a tenant request. Failure to meet metrics guaranteed by an SLA may result in a loss of revenue and/or loss of clients.

BRIEF DESCRIPTION OF THE DRAWINGS

The following detailed description makes reference to the accompanying drawings, which are now briefly described.

DETAILED DESCRIPTION OF EMBODIMENTS

A multi-tenant database, or other forms of multi-user databases, may reach an extensive size and include thousands or even millions of data objects. Although such a database may be accessed virtually as a single database system, the database may be implemented using a variety of computer hardware and may be physically located in a plurality of locations, thereby making the database system susceptible to downtime or increase lag times based on a variety of factors.

In some embodiments, a first entity may offer web-based services to a plurality of clients, including management of an online, multi-tenant database to store data objects for the various clients. To provide physical storage space for the database, the first entity may utilize a second entity that specializes in providing online storage to respective customers. In such an example, the second entity may provide limited resources for addressing potential increases in lag time and/or potential downtime events. When a downtime event is detected, there may be a non-trivial delay for a mitigation action (e.g., a failover to a backup system) to be determined and implemented. Such delays may cause failures to meet SLA metrics, resulting in dissatisfied users.

To address such issues, techniques are disclosed herein for detecting and responding to potential downtime of a database in a manner that enables failover actions to be implemented swiftly and efficiently. Such techniques may include use of a monitoring service that is executing in a public cloud computer system. This monitoring service may receive metrics for a database system implemented on a single instance of a virtual machine in the public cloud computer system. These metrics may include information from a variety of sources, including a first set of metrics indicative of status of the database system, a second set of metrics indicative of status of the virtual machine, and a third set of metrics indicative of status of the public cloud computer system. The monitoring service may continuously determine a primary database candidate from a set of standby databases. In response to determining that received metrics correspond to one of a plurality of disruption scenarios, the monitoring service may issue a command to trigger a failover to the primary database candidate.

Use of such techniques may reduce an amount of time needed to process the received metrics. Furthermore, the use of a variety of sources of metrics may increase an ability to identify a potential disruption quickly and accurately by comparing the various metrics to the set of predetermined disruption scenarios. The continuous monitoring of the standby databases enables the monitoring system to quickly identify a backup system to use for the failover operation. Disclosed techniques may enable an entity providing web services to meet and/or exceed metrics established by tenant SLA's.

Figure 1:
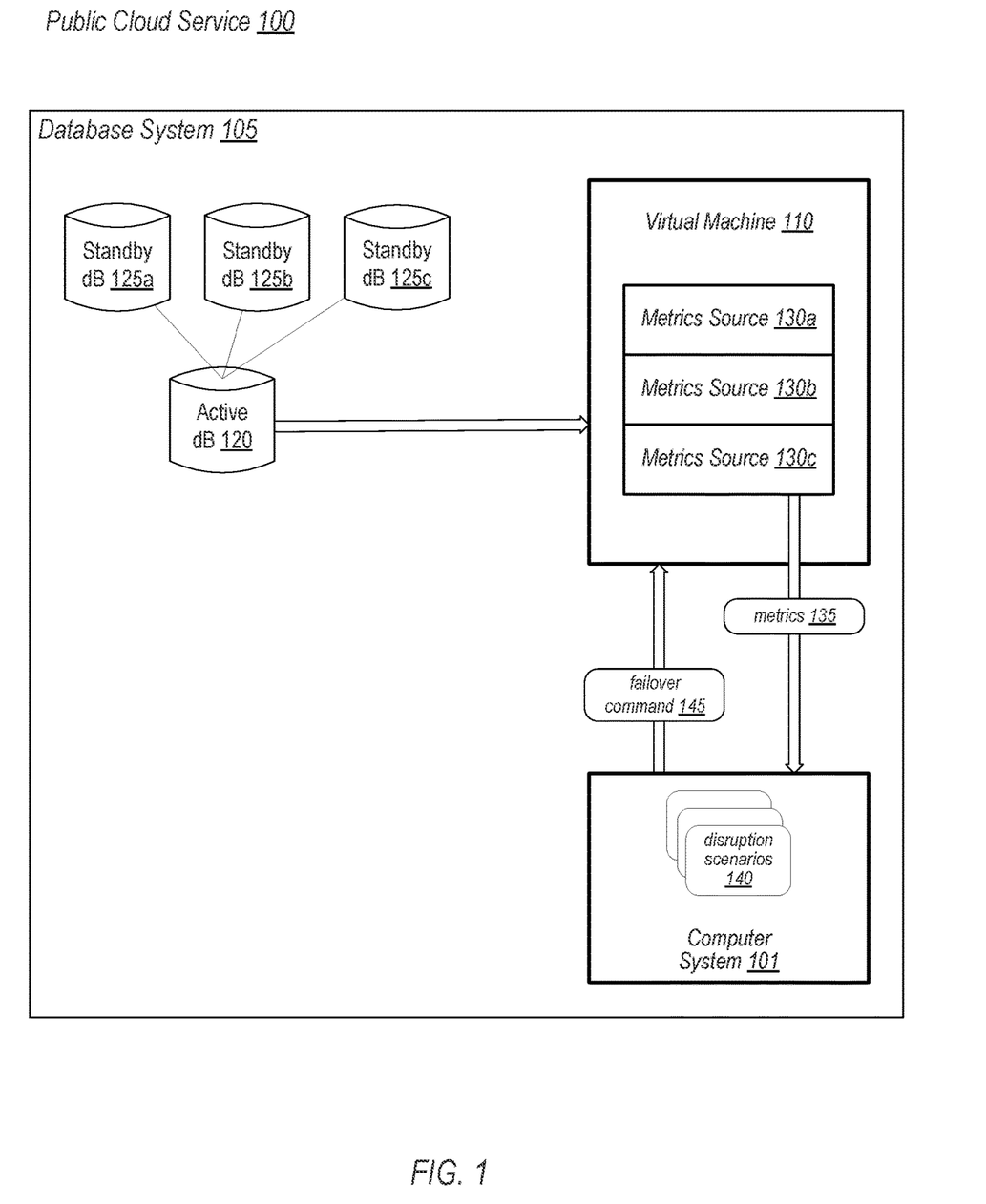
FIG. 1 illustrates a block diagram of an embodiment of a database system, implemented, at least in part, in a public cloud service.

A block diagram for an embodiment of a database system is illustrated in FIG. 1. Database system 105, as illustrated, is implemented within public cloud service 100 and includes computer system 101, virtual machine 110, active database (dB) 120, and standby databases (dBs) 125a-125c (collectively 125). In various embodiments, computer system 101 may be implemented as a single computer (e.g., a desktop computer, laptop computer, server computer), or a plurality of computers located in a single location or distributed across multiple locations. In some embodiments, computer system 101 may be implemented using a virtual machine hosted by one or more server computer systems. Although shown as a part of database system 105, computer system 101 may be implemented separately, including for example, independent of public cloud service 100.

As shown, database system 105 is implemented, at least in part, within public cloud service 100. In some embodiments, public cloud service 100 and database system 105 may be owned and/or managed by different entities. Database system 105 may be part of a multi-tenant web service that utilizes active database 120 for storage of tenant data objects. Accordingly, various tenants may utilize services provided by database system 105 to store, access, and manipulate data objects in active database 120. Various tenants may have respective SLAs in place that specify particular qualities of service when using database system

105. In some embodiments, thousands to millions of tenants may utilize these web services which, in turn, may place varying degrees of load on database system 105, thereby creating difficulties to meet SLA-specified metrics during times of peak load. Furthermore, other factors may exacerbate these difficulties such as network congestion, regional power outages, equipment downtime, and the like.

Database system 105 includes active database 120 which may be used as a primary access point to data objects stored within database system 105. Tenants may access active database 120 via virtual machine 110 implemented within public cloud service 100. For example, virtual machine 110 may include an instance of an operating system and one or more applications that provide an interface for one or more tenants to access a cloud-based application environment. Use of these cloud-based applications may generate a variety of data objects for each tenant, such as data files, settings, profiles, and such. These data objects may then be stored in active database 120. In some embodiments, active database 120 may also be a virtual machine, implemented within public cloud service 100, that provides an interface to virtual machine 110 for handling database operations. When database system 105 is in operation, a plurality of active databases 120 and virtual machines 110 may be active for supporting multiple tenants across a country or across the world.

Standby databases 125 may be used as failover systems in case active database 120 experiences issues that result in increased lag times for accessing data objects in response to tenant requests. Like active database 120, standby databases 125 may also be implemented as virtual machines within public cloud service 100. In some cases, one of standby databases 125 may be used to off-load a portion of workload from active database 120 at times when active database 120 becomes overloaded with requests. In other cases, a failure may occur with active database 120 and/or with associated network connections resulting in use of one of standby databases 125 to replace active database 120, either short-term or long-term.

An entity owning and/or operating database system 105 may utilize public cloud service 100 to provide a service that is capable of reaching a vast number of users in all regions of the globe, while allowing a third party to manage the physical infrastructure that enables the users to utilize database system 105. Such a structure, however, may present various challenges for meeting SLA-specified metrics and detecting operating conditions that may be indicative of a potential service disruption.

As illustrated, computer system 101 is configured to track the current operating conditions and to take corrective action in the event that conditions are indicative of a potential service disruption. For example, computer system 101 may be configured to track one or more lag times for ones of standby databases 125 included in database system 105. These lag times may be used to select a particular one of standby databases 125 as a primary backup database in the event a failover operation is triggered.

In addition, computer system 101 may also be configured to access metrics 135 for a particular instance of the database system implemented on virtual machine 110 in public cloud service 100. Metrics 135 may be received from a plurality of metrics sources 130a-130c (collectively 130). In some embodiments, metrics 135 may include a first set of metrics indicative of status of the particular instance of active database 120, a second set of metrics indicative of status of virtual machine 110, and a third set of metrics indicative of status of the public cloud service 100.

For example, the first set of metrics 135 may include an indication that an attempted status check of public cloud service 100 returned an error condition (metrics source 130a). Computer system 101 may issue (or cause to be issued) a request for a status of public cloud service 100 (or a virtual machine implemented within public cloud service 100, such as active database 120). Such a request may return one or more values indicative of any error conditions that may currently be valid for active database 120. The status request may be, or may include, a server ping used to evaluate a current communication lag time with active database 120.

The second set of metrics 135 may include, e.g., an indication that an attempt to communicate with virtual machine 110 returned an error condition (metrics source 130b). Computer system 101 may be configured to ping and/or request a status of virtual machine 110. Again, one or more values may be returned to computer system 101 that are indicative of a status of virtual machine 110, including any valid error conditions.

The third set of metrics 135 may include an indication that a primary database candidate is currently available (metrics source 130c). Computer system 101 may, for example, determine a database lag between active database 120 and one or more of standby databases 125 to determine respective lag times in communicating with the one or more standby databases 125. These lag times may be compared, by computer system 101, to a maximum allowable lag. The results of the comparisons may be indicative of a status of the database system.

As illustrated, computer system 101 may further be configured to determine that metrics 135 are indicative of a potential disruption of database system 105. For example, computer system 101 may use metrics 135 to determine a state of database system 105. This determined state may then be compared to a set of disruption scenarios 140 to determine if any of disruption scenarios 140 are applicable to the current state of database system 105. If computer system 101 determines that the current state corresponds to one of disruption scenarios 140, then computer system 101 may trigger a failover operation. Computer system 101 may be configured to, based on the tracked lag times, trigger a failover to one of standby databases 125, e.g., the previously selected primary backup database.

In some embodiments, after the failover to the primary backup database has occurred, computer system 101 may discontinue further failover operations for a particular amount of time. For example, the particular amount of time may be used to allow the primary backup database to come online, take over some or all of the workload of active database 120, and impact the metrics that caused the failover to be triggered. In some cases, it may take some amount of time (e.g., minutes, hours, days, etc.) for the primary backup database to assume some or all of the workload of active database 120 before the metrics reflect the use of the additional/replacement database.

Use of the techniques illustrated by FIG. 1 and described above may enable a computer system to detect a potential disruption in service of a multitenant database and trigger a failover to a backup database, thereby avoiding or reducing an impact of the disruption. The disclosed techniques include an ability to monitor metrics from a variety of sources and then compare these collected metrics to ones of a set of user-defined scenarios further enabling an ability to detect indications of a potential failure of a database with increased accuracy. Use of techniques may further provide disruption mitigation solutions that are capable of overcoming limitations imposed by a third party that manages a public cloud service in which the database system is implemented.

It is noted that the system depicted in FIG. 1 is merely an example for demonstrating the disclosed concepts. The depiction is simplified for clarity, and in other embodiments, additional elements may be included. For example, additional databases (standby and/or active), as well as virtual machines, may be included in other embodiments. Although computer system 101 is depicted as being included within public cloud service 100, in other embodiments computer system 101 may be implemented outside of public cloud service 100, such as in a facility managed by an owner/operator of database system 105.

The system illustrated in FIG. 1 is described as tracking lag times of a plurality of standby databases. Determination of these lag times may be accomplished using various techniques. A particular example of tracking database lag time and determining a primary backup database is shown in FIG. 2.

Figure 2:
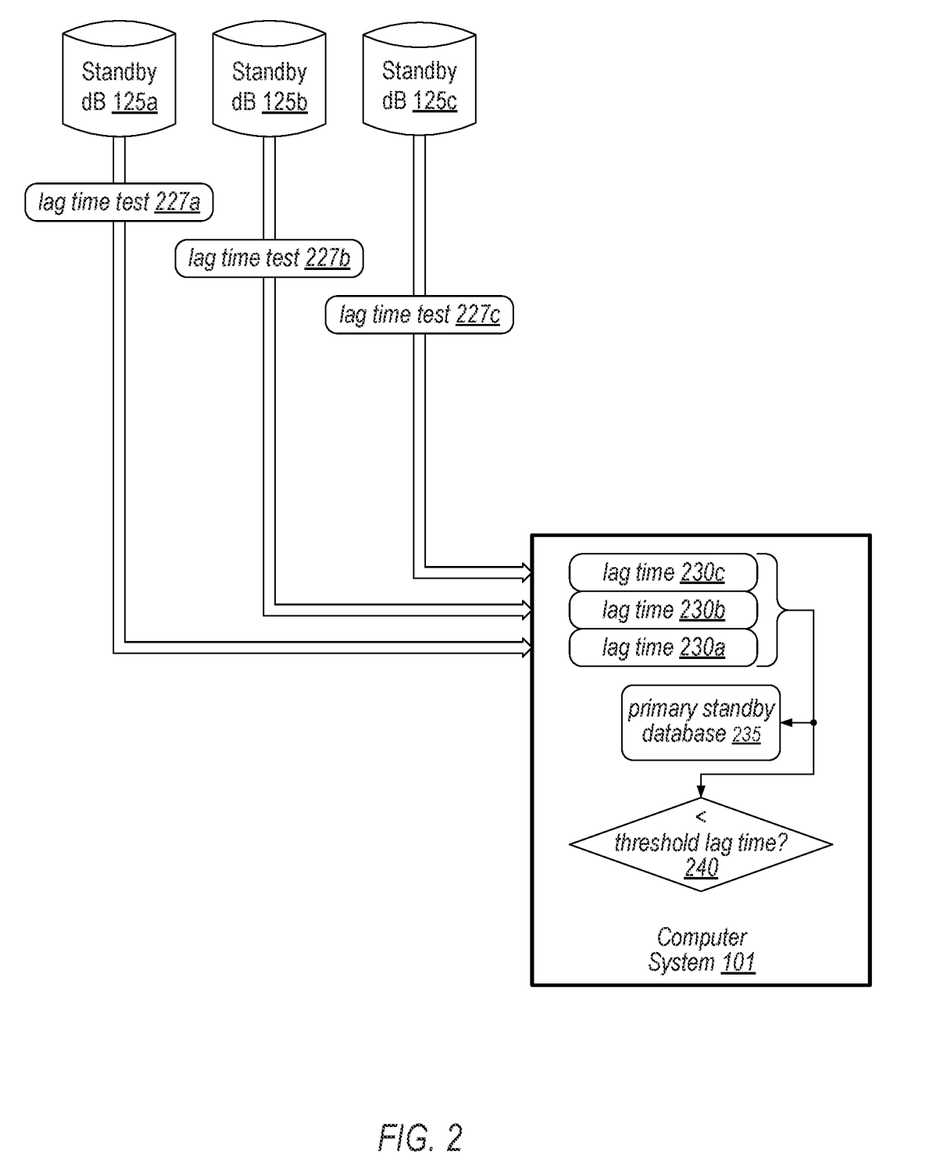
FIG. 2 shows a block diagram of an embodiment of the database system of FIG. 2 in which lag time tests are performed on a set of standby databases.

Moving to FIG. 2, a block diagram of an embodiment of database system 105 from FIG. 1 is shown. As illustrated, database system 105 includes standby databases 125a-125c and computer system 101. Computer system 101 performs lag time tests 227a-227c to determine lag times 230a-230c for standby databases 125a-125c, respectively.

For example, computer system 101 may continuously determine, for ones of standby databases 125, a respective lag time 230 for performing a failover operation. Lag time tests 227 may generate values for one or more characteristics for each of standby databases 125. Computer system 101 may then receive the values for the one or more characteristics for a given one of lag time tests 227 (e.g., 227a), and use the received values to determine a respective lag time 230a that is indicative of an amount of time it would take to perform a failover operation that transfers some or all of a current workload of active database 120 to standby database 125a.

Computer system 101 may perform lag time tests 227 concurrently or serially, using respective results to determine lag time 230 for each of standby databases 125. Based on the respective lag times 230 and prior to determining that metrics 135 are indicative of a potential disruption, computer system 101 may be configured to select one of standby databases 125 as primary standby database 235. For example, computer system 101 may select the standby database 125 that corresponds to the lowest value of lag times 230, e.g., the standby database that would have the least delay for completing a failover operation. In various embodiments, computer system 101 may continuously or periodically repeat lag time test 227, updating the selection for primary standby database 235 when a different one of standby databases 125 corresponds to the lowest value of lag time 230.

In some embodiments, computer system 101 may perform process 240 to determine whether any of lag times 230 are less than a threshold lag time. A threshold lag time may be established, e.g., by a system administrator or other operator associated with database system 105, as a maximum tolerable delay for performing a failover operation. Based on the tracked lag times 230 failing to satisfy the threshold lag time, computer system 101 may cause database system 105 to continue operation without triggering a failover despite an indication of a potential disruption. Accordingly, even if a current set of metrics 135 corresponds to one of the disruption scenarios 140, a failover operation may be skipped or cancelled if computer system 101 determines that none of standby databases 125 have a corresponding lag time 230 that satisfies (e.g., is less than) the threshold lag time.

It is noted that the embodiment of FIG. 2 is merely an example to demonstrate the disclosed concepts. Although three standby databases are shown, in other embodiments, any suitable number of standby databases may be included in the database service. Factors other than lag time may be used when selecting primary standby database, such as current and/or projected bandwidth capacities.

FIG. 1 illustrates one embodiment of a database system implemented in a public cloud service. Such a database service, however, may be implemented in various fashions. A different implementation is presented in FIG. 3.

Figure 3:
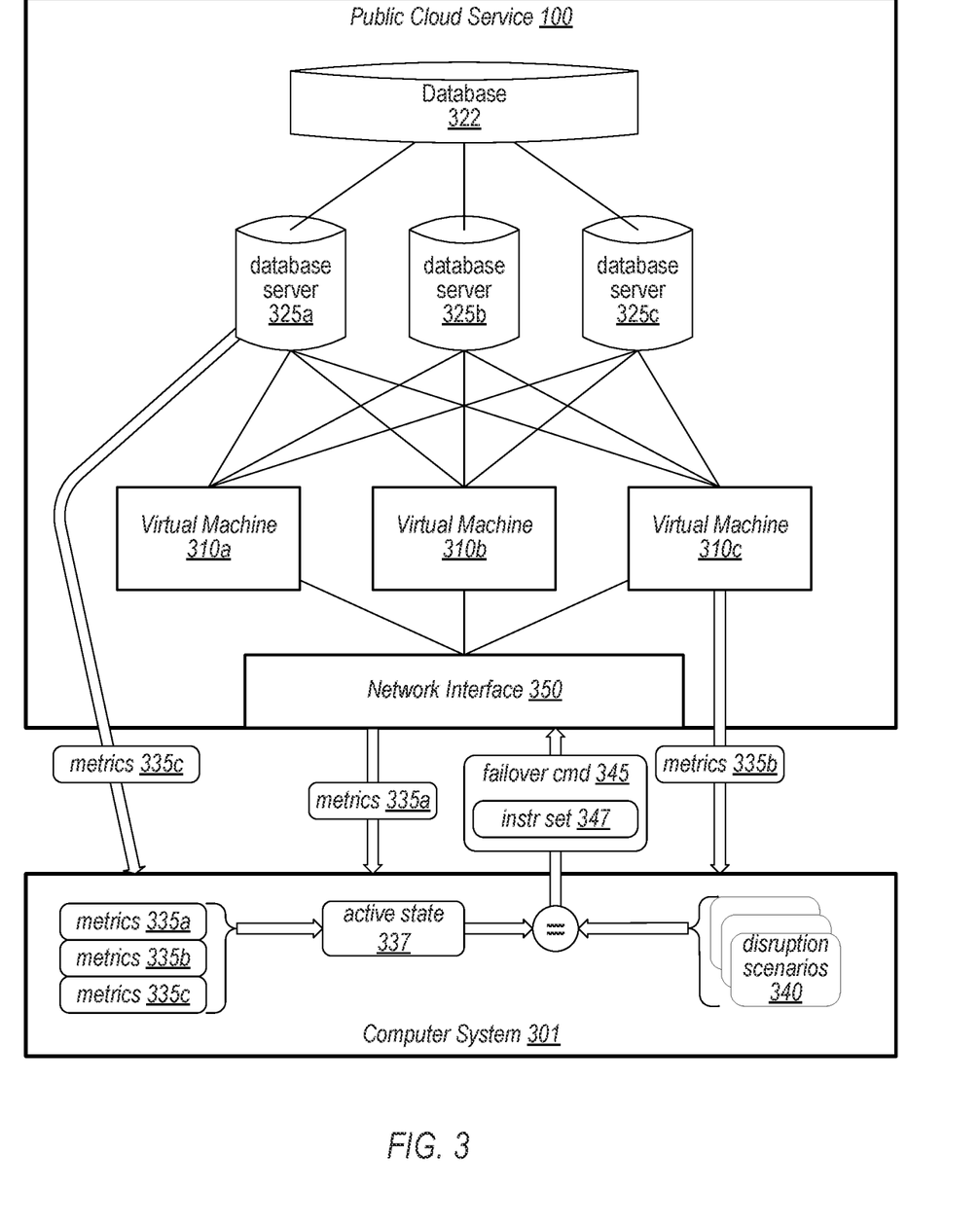
FIG. 3 depicts a block diagram of another embodiment of a database system, implemented, at least in part, in a public cloud service.

Turning to FIG. 3, a different embodiment of a database system implemented in a public cloud service is illustrated. At least a portion of database service 300 is implemented in public cloud service 100, including database 322, database servers 325a-325c (collectively 325), virtual machines 310a-310c (collectively 310), and network interface 350. Database service 300 also includes computer system 301 for monitoring operation of the portion of database service 300 in public cloud service 100.

Operators of database service 300 may utilize public cloud service 100 to provide various web-based services to a plurality of users that may be located across the globe. Provided services may include accesses to database 322 for executing various cloud applications, user data, account profiles, and the like. Although depicted as a part of public cloud service 100, in some embodiments, database 322 may be implemented outside of, but accessible to, public cloud service 100.

Network interface 350 may provide an interface to the internet, allowing global access to database service 300 by the plurality of users. User session may be hosted by one or more of virtual machines 310. Each instance of virtual machines 310 may provide an interface allowing users to interact with database 322, including launching and user instances of supported applications and accessing and editing data objects that respective users are authorized to access. Each of virtual machines 310 may communicate with one or more of database servers 325. Database servers 325 may be implemented as respective hardware computer systems, as virtual machines within public cloud service 100, or a combination thereof.

In some embodiments, one of database servers 325 (e.g., database server 325a) may function as a primary database server while the remaining servers (e.g., database servers 325b and 325c) are kept in a standby mode to function as failover servers should database server 325a experience a disruption. Virtual machines 310 may likewise be implemented in a similar fashion, e.g., with virtual machine 310c acting as a primary while virtual machines 310a and 310b remain in a standby state. Public cloud service 100 may be implemented across a plurality of service centers in different geographic locations. In such an embodiment, ones of database servers 325, as well as virtual machines 310, may be implemented on different hardware in the different locations. Various events in a given location may cause a locally implemented instance of virtual machine 310 and/or database server 325 to experience a disruption that causes delays and/or disconnections to users being hosted by these systems.

As illustrated, computer system 301 monitors operation of the portion of database service 300 implemented in public cloud service 100. Computer system 301 is depicted as being separate from public cloud service 100 but, in other embodiments, may be implemented as a respective virtual machine within public cloud service 100. Computer system 301 may be configured to maintain a list of a plurality of standby servers (including, e.g., database servers 325b and 325c) included in public cloud service 100. This maintaining may include identifying a first one of the plurality of standby servers (e.g., database server 325c).

Computer system 301 may use metrics from a plurality of sources in public cloud service 100 to determine active state 337 of public cloud service 100. As shown, computer system 301 receives metrics 335a, 335b, and 335c (collectively 335) from public cloud service 100. Metrics 335a may be received from network interface 350 and may indicate a status of network communications to and from the physical location where database server 325a is being implemented. Metrics 335b may be received from virtual machine 310c that is hosting users of database service 300 and may be indicative of a state of operation of virtual machine 310c. In a similar fashion, metrics 335c may be received from database server 325a and may indicate a state of operation of database server 325a. Collectively, these metrics 335 may be used to indicate active state 337 for service provided by the primary server (database server 325a).

Based at least on active state 337, computer system 301 may be configured to issue failover command (cmd) 345 to trigger a failover to the first standby server (e.g., database server 325c). For example, computer system 301 may compare active state 337 to ones of potential disruption scenarios 340 and issue failover command 345 if active state 337 is indicative of one of disruption scenarios 340. In some embodiments, metrics 335 may be used to generate a numeric value for active state 337. This numeric value may be used as an index to select one of a plurality of disruption scenarios 340.

As illustrated, failover command 345 includes a particular set of instructions (instr set) 347. The set of instructions 347 may provide public cloud service 100 (e.g., via virtual machine 310c) with a sequence of actions for bringing the first one of the plurality of standby servers (e.g., database server 325c) into an active state to replace or supplement database server 325a in an efficient manner.

In some embodiments, the set of instructions 347 may be associated with the particular value of active state 337. For example, ones of disruption scenarios 340 may be associated with respective ones of a plurality of failover commands 345. In such an embodiment, ones of the plurality of failover commands 345 may include respective sets of instructions 347, thereby allowing the actions to be taken for the failover operation to be tailored for specific scenarios. For example, in a first disruption scenario 340, database server 325a may be slow to respond to status queries due to a work overload but still capable of performing tasks related to the operation of database service 300. A respective failover command 345 may include instructions 347 for activating database server 325c while maintaining database server 325a as active and allowing database server 325c to off-load a portion of workload from database server 325a. In other embodiments, instructions 347 for activating database server 325c may keep database server 325a active while database server 325c off-loads all of workload from database server 325a in a gradual manner before placing database server 325a in an inactive mode. In a different disruption scenario 340, database server 325a may have metrics 335 that are indicative of an impending crash. In this case, a respective failover command 345 may include instructions 347 for rapidly activating database server 325c to completely off-load tasks from database server 325a and placing database server 325a in an inactive mode. For example, if database server 325a is implemented as a virtual machine, the virtual machine may be released and a replacement virtual machine allocated in different portion of public cloud service 100.

It is noted that FIG. 3 is merely an example to demonstrate the disclosed concepts. For clarity, a limited number of database servers and virtual machines are depicted. In other embodiments, any suitable number of these elements may be included. In various embodiments, the collection of metrics, determination of an active state, and comparison of the active state to the disruption scenarios may be implemented as a software process, by hardware circuits, or a combination thereof.

Figure 4:
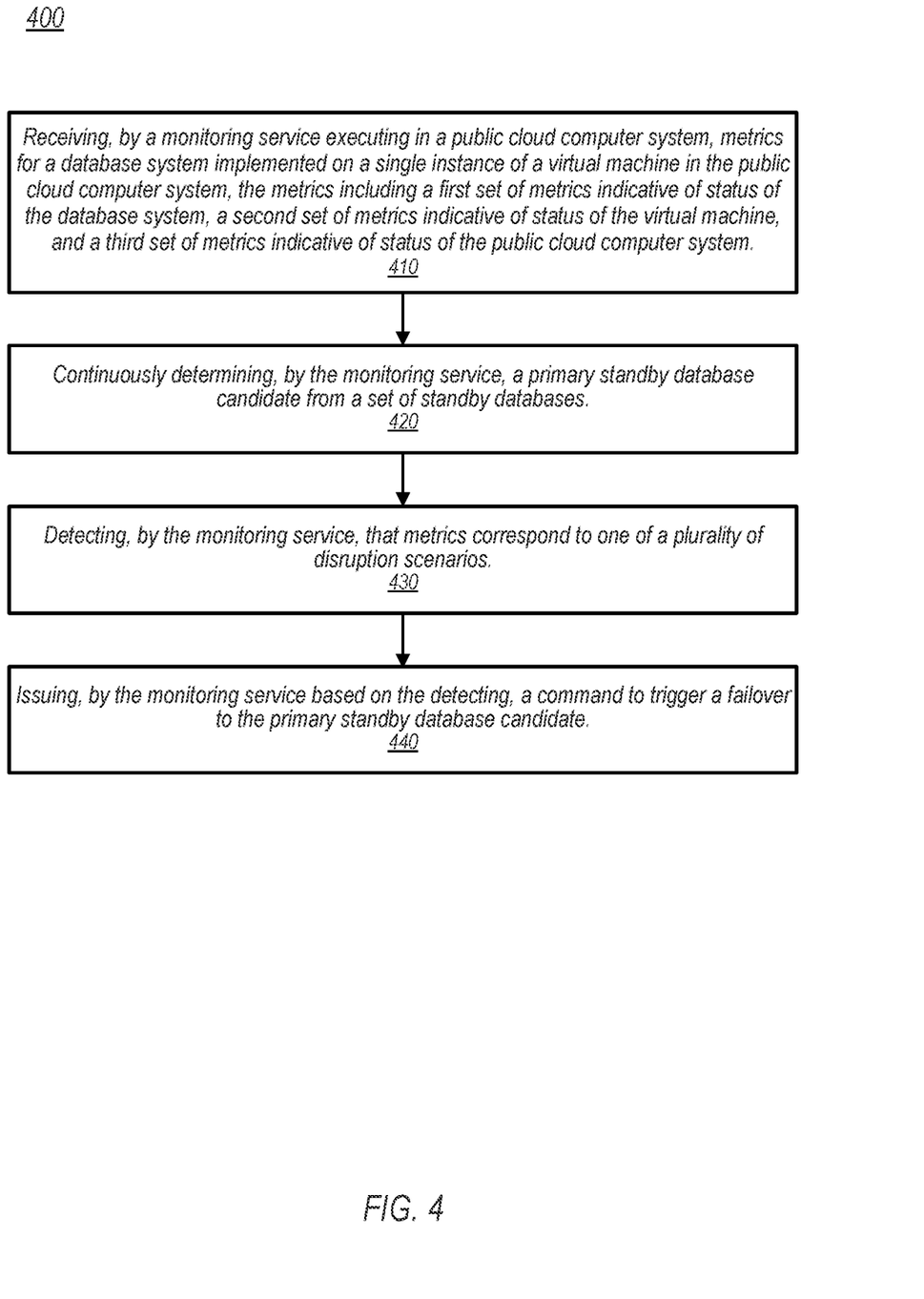
FIG. 4 illustrates a flow diagram of an embodiment of a method for performing a failover operation from an active database server to a primary standby database server.
Figure 5:
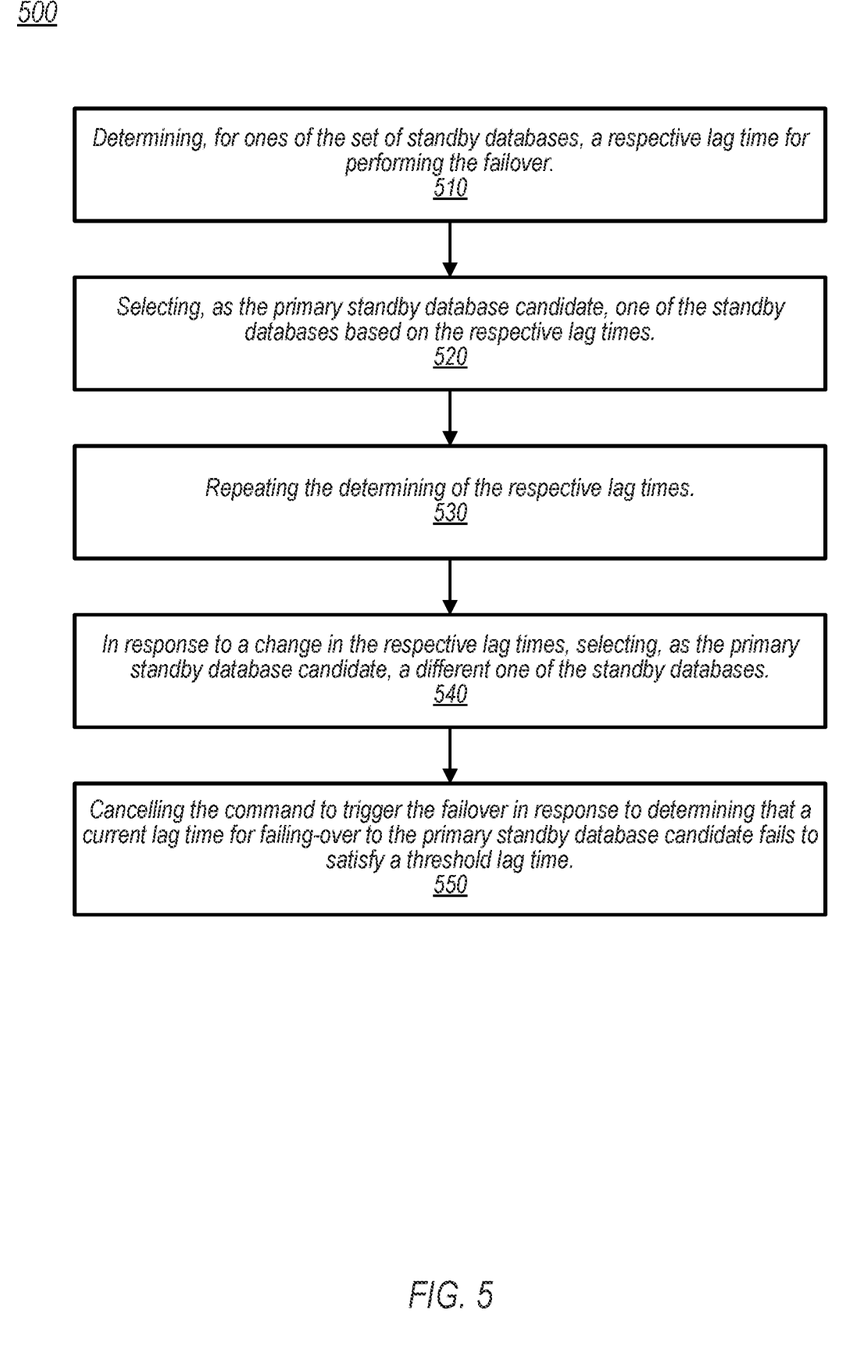
FIG. 5 shows a flow diagram of an embodiment of a method for selecting a primary database candidate from a set of standby databases.

FIGS. 1-3 depict various techniques for monitoring a database system implemented in a public cloud service and detecting and responding to potential failover scenarios. Such techniques may be implemented using a variety of methods. FIGS. 4 and 5 illustrate two such methods.

Proceeding to FIG. 4, a flow diagram for an embodiment of a method for monitoring a database service for a potential disruption and triggering a failover is shown. In various embodiments, method 400 may be performed by computer system 101 or 301 in FIGS. 1-3. For example, computer system 101 may include (or have access to) a non-transitory, computer-readable medium having program instructions stored thereon that are executable by the computer system to cause the operations described with reference to FIG. 4. Method 400 is described below using computer system 101 of FIG. 1 as an example. References to elements in FIG. 1 are included as non-limiting examples.

At block 410, method 400 begins by receiving, by a monitoring service executing in a public cloud computer system, metrics for a database system implemented on a single instance of a virtual machine in the public cloud computer system. For example, computer system 101 may perform operations for monitoring database system 105 that is implemented, at least partially, in public cloud service 100. Active database 120, along with standby databases 125, may be implemented using one or more virtual machines. In addition, virtual machine 110 may provide an interface for one or more users utilizing database system 105, including providing an interface between the users and active database 120.

Received metrics 135 may include a first set of metrics indicative of status of the database system, a second set of metrics indicative of status of the virtual machine, and a third set of metrics indicative of status of the public cloud computer system. The first set of metrics may be received from metrics source 130a and may include an indication whether an attempted status check of active database 120 returned an error condition. The second set of metrics may be received from metrics source 130b and may include an indication whether an attempt to communicate with virtual machine 110 returned an error condition. The third set of metrics may be received from metrics source 130c and may include an indication whether a primary database candidate is currently available.

Method 400 continues at block 420 by continuously determining, by the monitoring service, a primary database candidate from a set of standby databases. Computer system 101, for example, may repeatedly check a status of ones of standby databases 125. Based on the respective results of these status checks, one of standby databases is selected as the primary database candidate to be used in the event a failover operation is triggered. This determination may be repeated over time to continuously validate a current status for ones of standby databases 125 and, if warranted, select a different one of standby databases 125 as the primary database candidate. A frequency of repeating the status checks may vary in different embodiments. In some cases, computer system 101 may begin a new set of status checks immediately after a previous set of status checks completes. In other cases, a particular time interval may be used, such as once a minute, once a day, once a week, etc. In some embodiments, the interval between status checks may depend on prior results of recent status checks. For example, if the last two or three status checks indicate a potential change in the availability of standby databases 125 for use as a failover database, then the interval may be shortened, and vice versa.

At block 430, method 400 proceeds by detecting, by the monitoring service, that metrics correspond to one of a plurality of disruption scenarios. Computer system 101, for example, may use a current set of metrics 135 to determine an active state that includes metrics from two or more of the first, second, and third sets of metrics. In some embodiments, computer system 101 may use metrics from all three sets, every time. In other embodiments, use of some of the sets of metrics may depend on values received in a particular set of metrics. For example, if there are no standby databases 125 available for use as a failover database, then evaluating the other sets of metrics may be moot. After determining an active state, computer system 101 may compare the active state to ones of disruption scenarios 140. Disruption scenarios 140 may include various scenarios that have been previously observed to result in a need to trigger a failover to a standby database. Disruption scenarios 140 may include one or more scenarios that have not actually occurred in database system 105 but would be critical to operation if they occurred.

For example, a first scenario may include a sudden increase in response time from active database 120 in combination with an increase in user activity in virtual machine 110. This first scenario may indicate database system is functioning properly but is receiving an increase in usage that may benefit from bringing one of standby databases 125 online to help offload some of the workload. A second scenario may include a sudden increase in response time from active database 120 without a corresponding increase in user activity in virtual machine 110. This second scenario may indicate a potential issue with active database 120 and therefore trigger a failover to the primary database candidate, allowing active database 120 to undergo maintenance without disrupting service to the users.

Method 400 continues to block 440 by issuing, by the monitoring service based on the detecting, a command to trigger a failover to the primary database candidate. As illustrated in FIG. 1, computer system 101 issues failover command 145 in response to metrics 135 indicating a potential for a disruption to the operation of database system 105. In various embodiments, failover command 145 may cause the primary database candidate to become active to assume some or all of the workload from active database 120, based on the corresponding disruption scenario. For example, issuing failover command 145 may include issuing a particular set of instructions with the command, wherein the particular set of instructions are selected based on the corresponding disruption scenario 140.

Referring to the scenarios presented above, in the first scenario, a first set of instructions may cause the primary database candidate to become active and gradually assume the workload from active database 120. In the second scenario, a second set of instructions may cause the primary database candidate to become active and rapidly assume all of the workload from active database 120, as well as place active database 120 into a standby or off state. Further instructions in the second set may cause a notification to be set to a system administrator to perform maintenance on active database 120.

In some embodiments, after issuing failover command 145, computer system 101 may disable, for a particular amount of time from the issuing, subsequent issuing of commands to trigger a failover. Performing a failover operation may consume service bandwidth and/or cause delays for the users of database system 105. Accordingly, operators of database system 105 may desire to avoid a situation in which a particular condition (or conditions) result in metrics that repeatedly correspond to one of disruption scenarios 140, resulting in one failover operation after another being performed. To avoid such situations, computer system 101 may be configured to pause metrics collection, comparisons to disruption scenarios, and/or issuing failover commands for a predetermined amount of time after a failover command is issued. The primary database candidate may take some amount of time to reach normal operating efficiency after a failover operation is performed. For example, frequently accessed data objects may be cached after some amount of time, as well as establishing an effective arbitration scheme for a plurality of users. This pausing of failover operations may provide an adequate amount of time for the primary database candidate to assume the workload of the previous active database and settle into the workflow before another failover command is issued, thereby avoiding a premature misdiagnosis that the newly active database is tracking towards one of the disruption scenarios.

Use of the disclosed method 400 may allow for a preemptive failover to be triggered before a critical disruption of services occurs. Use of disruption scenarios to determine if and when to trigger the failover may allow for a greater degree of accuracy for predicting potential disruption events, thereby reducing unnecessary failovers that may consume service bandwidth and/or cause delays for the users of database system 105.

It is noted that the method of FIG. 4 includes blocks 410-440. Method 400 may end in block 440. In some embodiments, at least a portion of method 400 may be repeated. For example, blocks 410 and 420 may be repeated until a disruption scenario is detected in block 430. In some cases, method 400 may be performed concurrently with other instantiations of the method. For example, database system 105 may include two or more databases that are active concurrently. Computer system 101 (or multiple instances of computer system 101) may perform instances of method 400 independently from one another.

Proceeding now to FIG. 5, a flow diagram of a method for selecting a primary database candidate is illustrated. In a similar manner to method 400, method 500 may be performed by computer systems 101 or 301 as shown in FIGS. 1-3. In some embodiments, computer system 101 may include (or have access to) a non-transitory, computer-readable medium having program instructions stored thereon that are executable by the computer system to cause the operations described with reference to FIG. 5. In some embodiments, method 500 may be performed in combination with method 400 in FIG. 4. For example, method 500 may be performed as part of block 420 of method 400. Method 500 is described below using computer system 101 of FIGS. 1 and 2 as an example. References to elements in FIGS. 1 and 2 are included as non-limiting examples.

At block 510, method 500 begins by determining, for ones of the set of standby databases, a respective lag time for performing the failover. For example, computer system 101 may perform lag time tests 227a-227c on standby databases 125a-125c, respectively. These lag time tests may include a simple series of requests and/or more complicated series of instructions intended to evaluate a given standby database's readiness for use in a failover operation. Lag time tests 227 may produce respective values that computer system 101 may use to determine lag times 230.

Method 500 continues at block 520 by selecting, as the primary database candidate, one of the standby databases based on the respective lag times. Computer system 101 may select, for example, a respective one of standby databases 125 that corresponds to a lowest lag time 230. A lowest lag time 230 may be indicative of a lower amount of time required by the corresponding standby database 125 to assume the workload of the current active database in the event of a failover operation. In other embodiments, other characteristics of standby databases 125 may be considered when choosing the primary database candidate. For example, current workloads/available bandwidth may be considered as well. Standby database 125a may have a lower lag time 230a than lag time 230c for standby database 125c. If, however, standby database 125a has a first bandwidth that is lower than a second bandwidth of standby database 125c, then standby database 125c may be selected even if lag time 230c is higher than lag time 230a. In some cases, a combination of bandwidth and lag time and/or other factors may be used to determine a candidate value for each of standby databases 125 which may then be used to select the primary database candidate.

At block 530, method 500 proceeds by repeating the determining of the respective lag times. As previously disclosed, computer system 101 may repeat lag time tests 227 in a periodic fashion, generating a set of test results with each test. An interval for repeating lag time tests 227 may be fixed or may vary based on current operating conditions for database system 105. For example, if an overall workload for database system 105 is low and there is no indication of an impending disruption, then the time between lag time tests 227 may be increased. In contrast, if results of lag time tests 227 provide an indication that a workload of database system 105 and/or of public cloud service 100 is increasing, then the time between lag time tests 227 may be decreased to better prepare for a potential disruption.

Method 500 further continues to block 540 by, in response to a change in the respective lag times, selecting, as the primary database candidate, a different one of the standby databases. After receiving each set of test results, computer system 101 may redetermine lag times 230 and use the latest set to determine if a different one of standby databases 125 corresponds to the current lowest lag time 230. If so, then computer system 101 may reassign the different one of standby databases 125 as the primary database candidate.

At block 550, method 500 proceeds by cancelling the command to trigger the failover in response to determining that a current lag time for failing-over to the primary database candidate fails to satisfy a threshold lag time. In some embodiments, computer system 101 may continue to perform lag time tests 227 even after a failover command is issued. In such embodiments, if a latest set of lag times 230 fail to have at least one value that satisfies (e.g., is lower than) an established threshold value, then the failover command may be cancelled. Moreover, computer system 101 may, prior to issuing a failover command, determine that a latest set of lag times 230 fail to have at least one value that is below the threshold value. In such cases, computer system 101 may suspend failover operations until a latest set of lag times 230 has at least one value that satisfies the threshold value. In some embodiments, computer system 101 may have different threshold lag time values for different scenarios. For example, a first set of scenarios may indicate an increase in response times to user requests that fail to meet SLA metrics, but otherwise, do not indicate a more severe disruption to service. A second set of scenarios, however, may be indicative of a more serious disruption, such as excessively long response times or even a complete failure to respond to user requests. The first set of scenarios may utilize a more aggressive (e.g., shorter) threshold for determining whether to suspend failover operations, while the second set of scenarios may utilize longer threshold values such that failover operations are suspended only when very serious delays are being experienced.

It is noted that the method of FIG. 5 includes blocks 510-550. The method may end after block 550 is performed or may be repeated, in whole or in part. For example, blocks 530 and 540 may repeat for as long as database system 105 is active. In a comparable manner to method 400, method 500 may be performed concurrently with other instantiations of itself. As stated above, method 500 may correspond to operations performed in block 420 of method 400. Multiple instances of method 400 may be performed concurrently, therefore multiple instances of method 500 may be performed concurrently with itself and with method 400.

Figure 6:
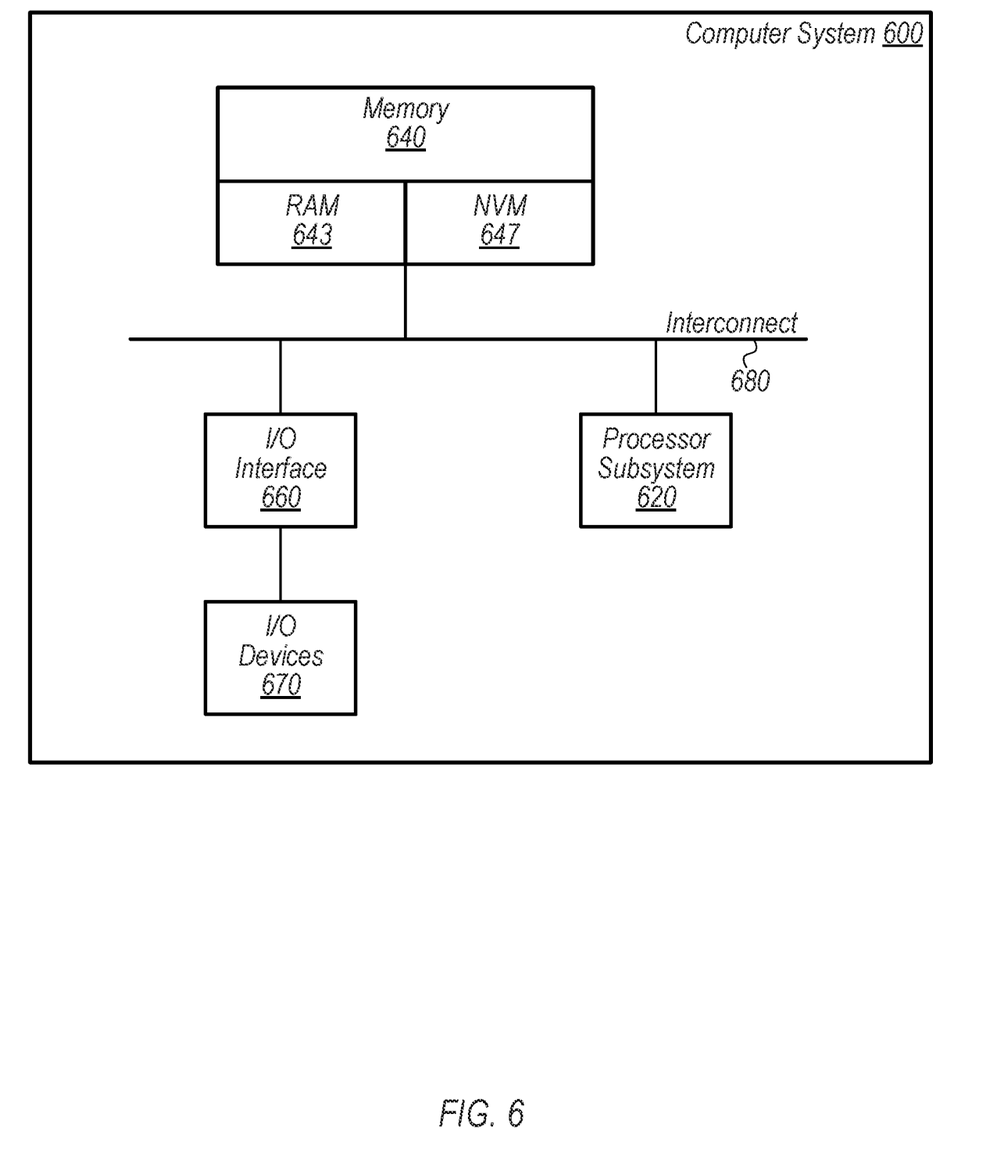
FIG. 6 depicts a block diagram of an embodiment of a computer system.

Referring now to FIG. 6, a block diagram of an example computer system 600 is depicted. Computer system 600 may, in various embodiments, implement one or more of the disclosed computer systems, such as computer systems 101 and 301 shown in FIGS. 1-3. In addition, one or more instances of computer system 600 may be used to implement and public cloud service 100 in FIGS. 1-3.

Computer system 600 includes processor subsystem 620 that is coupled to system memory 640 and I/O interfaces(s) 660 via interconnect 680 (e.g., a system bus). I/O interface(s) 660 is coupled to one or more I/O devices 670. Computer system 600 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, etc. Although a single computer system 600 is shown in FIG. 6 for convenience, computer system 600 may also be implemented as two or more computer systems operating together.

Processor subsystem 620 may include one or more processors, also referred to herein as "computer processors" or "processing units." In various embodiments of computer system 600, multiple instances of processor subsystem 620 may be coupled to interconnect 680. In various embodiments, processor subsystem 620 (or each processor unit within 620) may contain a cache or other form of on-board memory.

System memory 640 is usable to store program instructions executable by processor subsystem 620 to cause computer system 600 perform various operations described herein, including for example, methods 400 and 500. System memory 640 may be implemented, as shown, using random access memory (RAM) 643 and non-volatile memory (NVM) 647. Furthermore, RAM 643 may be implemented using any suitable type of RAM circuits, such as various types of static RAM (SRAM) and/or dynamic RAM (DRAM). NVM 647 may include one or more types of non-volatile memory circuits, including, for example, hard disk storage, solid-state disk storage, floppy disk storage, optical disk storage, flash memory, read-only memory (PROM, EEPROM, etc.), and the like. Memory in computer system 600 is not limited to primary storage such as system memory 640. Rather, computer system 600 may also include other forms of storage such as cache memory in processor subsystem 620, and secondary storage coupled via I/O devices 670 such as a USB drive, network accessible storage (NAS), etc. In some embodiments, these other forms of storage may also store program instructions executable by processor subsystem 620.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 670 includes a network interface device (e.g., configured to communicate over Wi-Fi, Bluetooth, Ethernet, etc.), and computer system 600 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different elements (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

In this disclosure, various "modules" operable to perform designated functions are shown in the figures and described in detail. As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
receiving, by a monitoring service executing in a public cloud computer system, metrics for a database system implemented on a single instance of a virtual machine in the public cloud computer system, the metrics including a first set of metrics indicative of status of the database system, a second set of metrics indicative of status of the virtual machine, and a third set of metrics indicative of status of the public cloud computer system;
continuously determining, by the monitoring service for ones of a set of standby databases, a respective lag time for performing a failover;
selecting, by the monitoring service based on the respective lag times, a primary database candidate from the set of standby databases;
detecting, by the monitoring service, that the metrics correspond to one of a plurality of disruption scenarios; and
issuing, by the monitoring service based on the detecting, a command to trigger a failover to the primary database candidate.

2. The method of claim 1, wherein selecting the primary database candidate includes selecting, as the primary database candidate, one of the standby databases with a lowest value of the respective lag times.

3. The method of claim 1, further comprising:
repeating the determining of the respective lag times; and
in response to a change in the respective lag times, selecting, as the primary database candidate, a different one of the standby databases.

4. The method of claim 1, further comprising cancelling the command to trigger the failover in response to determining that a current lag time for failing-over to the primary database candidate fails to satisfy a threshold lag time.

5. The method of claim 1, further comprising disabling, for a particular amount of time from the issuing, subsequent issuing of commands to trigger a failover.

6. The method of claim 1, wherein detecting that the metrics correspond to the one disruption scenario includes:
determining an active state that includes metrics from two or more of the first, second, and third sets of metrics; and
comparing the active state to ones of the plurality of disruption scenarios.

7. The method of claim 1, wherein the first set of metrics that are indicative of the status of the database system include an indication whether an attempted status check of the database system returned an error condition.

8. The method of claim 1, wherein the second set of metrics that are indicative of the status of the virtual machine include an indication whether an attempt to communicate with the virtual machine returned an error condition.

9. The method of claim 1, wherein the third set of metrics that are indicative of the status of the public cloud computer system include an indication whether a primary database candidate is currently available.

10. The method of claim 1, wherein issuing the command includes issuing a particular set of instructions with the command, wherein the particular set of instructions are selected based on the corresponding disruption scenario.

11. A non-transitory computer-readable medium having program instructions stored thereon that are executable by a computer system in a public cloud computer system to cause the computer system to implement a monitoring service that is operable to perform operations comprising:

tracking one or more lag times for ones of a set of standby databases included in a database system;

continuously determining, for ones of the set of standby databases, a respective lag time for performing a failover;

selecting, based on the respective lag times, one standby database of the set of standby databases as a primary database candidate;

accessing metrics for a particular instance of the database system implemented on a virtual machine in the public cloud computer system, the metrics including a first set of metrics indicative of status of the particular instance of the database system, a second set of metrics indicative of status of the virtual machine, and a third set of metrics indicative of status of the public cloud computer system;

after the selecting, determining that the metrics are indicative of a potential disruption of the database system; and based on the tracked lag times, triggering a failover to one of the set of standby databases.

12. The non-transitory computer-readable medium of claim 11, wherein selecting one standby database of the set of standby databases as a primary database candidate includes selecting a standby database with a lowest value of the respective lag times.

13. The non-transitory computer-readable medium of claim 11, wherein the program instructions further cause the computer system to perform steps comprising:

selecting, as a primary database candidate, a standby database with a lowest respective lag time.

14. The non-transitory computer-readable medium of claim 11, wherein the program instructions further cause the computer system to perform steps comprising:

based on the tracked lag times failing to satisfy a threshold lag time, continuing operation of the public cloud computer system without triggering a failover despite the potential disruption.

15. The non-transitory computer-readable medium of claim 11, wherein the program instructions further cause the computer system to perform steps comprising:

after the failover to the one standby database has occurred, discontinuing further failover operations for a particular amount of time.

16. A computer system comprising:
a computer processor; and
a non-transitory computer-readable medium for storing instructions that when executed by the computer processor, cause the computer processor to perform steps comprising:

maintaining a list of a plurality of standby database servers included in a public cloud service, wherein the maintaining includes:

determining respective lag time values for ones of the plurality of standby database servers; and identifying a first one of the plurality of standby database servers as a first standby database server based on the respective lag time values;

using metrics from a plurality of sources in the public cloud service to determine an active state of the public cloud service, wherein the metrics are indicative of a status of a primary database server, and wherein the primary database server is implemented in a single virtual machine in the public cloud service; and based at least on the active state, issuing a command to trigger a failover to the first standby database server, wherein the command includes a particular set of instructions associated with the active state.

17. The computer system of claim 16, wherein identifying the first standby database server by identifying a standby database server with a lowest respective lag time value.

18. The computer system of claim 17, wherein the instructions further cause the computer processor to perform steps comprising:

continuously repeating the determining of the respective lag time values; and continuously identifying a standby database server with the lowest respective lag time value.

19. The computer system of claim 16, wherein, to issue the command to trigger the failover, the instructions further cause the computer processor to perform steps comprising:

determining that the active state is indicative of one of a set of potential disruption scenarios to the public cloud service.

20. The computer system of claim 19, wherein ones of the set of potential disruption scenarios are associated with respective commands, the respective commands including respective sets of instructions.

* * * * *